US007115202B2

(12) United States Patent
Fleuter et al.

(10) Patent No.: US 7,115,202 B2
(45) Date of Patent: Oct. 3, 2006

(54) METHOD FOR THE SEPARATION OF MULTI-PHASE MIXTURE AND DECANTING CENTRIFUGE SYSTEM FOR CARRYING OUT SAID METHOD

(75) Inventors: Markus Fleuter, Ennigerloh (DE); Andreas Brinkmann, Rheda-Wiedenbrucck (DE)

(73) Assignee: Westfalia Separator Industry GmbH, Oelde (DE)

( * ) Notice: Subject to any disclaimer, the term of this patent is extended or adjusted under 35 U.S.C. 154(b) by 288 days.

(21) Appl. No.: 10/467,640

(22) PCT Filed: Feb. 5, 2002

(86) PCT No.: PCT/EP02/01148

§ 371 (c)(1),
(2), (4) Date: Aug. 8, 2003

(87) PCT Pub. No.: WO02/062483
PCT Pub. Date: Aug. 15, 2002

(65) Prior Publication Data

US 2004/0219065 A1 Nov. 4, 2004

(30) Foreign Application Priority Data

Feb. 8, 2001 (EP) ................................ 01102962

(51) Int. Cl.
*B01D 17/038* (2006.01)
*B04B 13/00* (2006.01)
*G01N 9/30* (2006.01)

(52) U.S. Cl. ...................... 210/739; 210/787; 210/143; 210/374; 210/378; 494/1; 494/7; 494/37; 494/50; 494/52; 494/53; 422/72

(58) Field of Classification Search ................ 210/739, 210/787, 360.1, 380.1; 494/1, 37, 50, 52; 422/72
See application file for complete search history.

(56) References Cited

U.S. PATENT DOCUMENTS

| | | | | |
|---|---|---|---|---|
| 4,303,192 | A | 12/1981 | Katsume | |
| 5,948,271 | A * | 9/1999 | Wardwell et al. | 210/739 |

FOREIGN PATENT DOCUMENTS

| | | | |
|---|---|---|---|
| DE | 1 951 574 | | 10/1969 |
| DE | 43 20 265 | A1 | 6/1993 |
| DE | 195 00 600 | C1 | 1/1995 |
| EP | 1 044 723 | A1 | 3/2000 |
| WO | WO 97/20634 | | 6/1997 |

OTHER PUBLICATIONS

Intelligent Measurement and Control Technology for Optimized Process Management in Waste Water Treatment (Dr. H.-J. Beyer/M. Fleuter, Westfalia Separator Industry GmbH in: 4th Merseburg Symposium on Automation, Measurement Methods and Experiments in Mechanical Process Engineering, Nov. 1999.

* cited by examiner

*Primary Examiner*—David A. Reifsnyder
(74) *Attorney, Agent, or Firm*—Milde & Hoffberg, LLP

(57) ABSTRACT

A method for separating a multi-phase mixture (50) into a liquid phase (54) and a dry phase (52) with a specified dry matter concentration. A decanting centrifuge (100) with an annular immersion disk (14) and a weir arranged at an end face of a centrifuge drum (20) are used. After start-up of the centrifuge drum (20), the multi-phase mixture (50) is introduced into the centrifuge drum (20). The dry phase (52) and the liquid phase (54) are drawn off. The liquid level in the centrifuge drum (20), is controlled by the weir and compared to a tolerance range until the specified dry matter concentration is reached. The weir is positioned so reaction to concentration changes in the multi-phase mixture (50) is possible in both directions. The speed of the centrifuge drum (20) is lowered incrementally and the weir position adjusted, so the dry phase concentration remains constant.

16 Claims, 7 Drawing Sheets

METHOD FOR THE SEPARATION OF MULTI-PHASE MIXTURE AND DECANTING CENTRIFUGE SYSTEM FOR CARRYING OUT SAID METHOD

BACKGROUND OF THE INVENTION

The invention relates to a method for separating a multi-phase mixture into at least one liquid phase and one dry phase with a specified dry matter concentration $C_{TS}$, using a decanting centrifuge, which includes:

An annular immersion disk that is connected to a shaft at its inside circumference and that exhibits an outside diameter that is smaller than the inside diameter of a centrifuge drum; and At least one liquor weir with a weir gap arranged at the end face of the centrifuge drum that can be used to draw the liquid phase from the centrifuge drum, and with a tank depth setting device that can be used to set the tank depth $x_T$ of the liquid phase that rotates in the centrifuge drum, using the following steps:

a) Start-up of the centrifuge drum to a start-up drum speed $n_{Z,1}$, and setting the tank depth $x_T$ to a start-up tank depth $x_{T,1}$;

b) Introducing the multi-phase mixture into the rotating centrifuge drum;

c) Drawing off the dry phase through the at least one dry matter discharge opening, and drawing off the liquid phase through the weir gap; and d) Controlling the tank depth $x_T$ corresponding to the dry matter concentration $c_{TS}$ in the drawn off dry phase until a specified nominal dry matter concentration $c_{TS,1}$ is reached, using the tank depth setting device.

The tank depth is defined as the difference between the outside and inside diameter of the liquid ring that rotates inside the centrifuge drum.

A decanting centrifuge with at least a partial hydraulic transport system, such as is required for carrying out the method, is known from the German Patent No. DE 43 20 265 C2. With this method, a liquid ring between immersion disk and liquor weir is set in the rotating centrifuge drum to a certain fill level, the so-called tank depth, thus generating a hydrostatic pressure through the liquid phase that assists in discharging the dry phase. In addition to, or in place of, the discharge, the hydraulic transport system can also be carried out using the differential speed of rotatable screws.

Essentially, the weir is designed in two parts. A weir disc closes the cylinder-shaped jacket of the centrifuge drum and rotates with said drum. It is provided with at least one passage for discharging liquid from the centrifuge drum. Assigned to the weir plate is a parallel baffle plate that can be moved axially, and that is arranged at the fixed support of the rotatable centrifuge drum. A gap that stretches in the radial direction is created between the rotating weir plate and the fixed baffle plate. The liquid phase is thrown from the centrifuge drum through said gap. The width of the weir gap can be adjusted by the axial movement of the baffle. Reducing the width in the weir gap increases the pressure in the liquid phase such that the increased pressure increases the amount of the dry phase that is pressed out of the centrifuge drum. To some degree, the liquid phase also enters the dry phase, and thus reduces its concentration on dry matter. Conversely, widening the weir gap results in reduced pressure, a reduced hydraulic conveyance, and finally an increase in the dry matter concentration in the dry phase.

Such a liquid weir has proven itself in decanting centrifuges, because it can be adjusted at a rotating centrifuge drum, thus allowing the control of the dry matter concentration via the width of the weir gap. Using the control of the weir gap width allows for a response to changes in concentration and volume of the supplied multi-phase mixture while the process is running.

However, it has been found that the control of the dry matter concentration using the adjustable liquor weir requires an unchanging high energy input for the decanting centrifuge, which is rotating at high speeds. In particular, the high energy consumption is due to the fact that the supplied amount of multi-phase mixture consistently needs to be accelerated from an idle state until it has reached the high angular speed that is impressed using the centrifuge drum.

In the course of the process, the weir position may shift towards the edge, where the baffle plate of the weir can no longer be adjusted. Controlling the dry matter concentration is then no longer possible if the concentration and/or the amount of the supplied multi-phase mixture change significantly. The process must be interrupted and re-started using a drum speed that is determined empirically.

Known from the German Patent No. DE 195 00 600 is a pneumatic liquor weir, where the flow resistance of the liquid phase is increased by blowing pressure gas in the weir gap, thus increasing the tank depth. This design of the liquor weir also allows for controlling the dry matter concentration through adjusting the weir during operation.

Various methods that influence the properties of the separated phases using machine parameters such as the drum speed or the differential speed are recommended in the European Patent Publication No. EP 1 044 723 A1. However, with these methods, the composition of the liquid and dry phases is always at the center of the considerations. The disclosed control of the dry matter concentration via variations of the drum speed requires, however, increased energy input. In addition to the already high energy consumption at a high base speed, frequent braking and accelerating of the drum is very energy-intensive due to the high mass moment of inertia of a loaded decanting centrifuge and the high angular speeds.

A method that would be suitable for operating a decanting centrifuge using an adjustable liquor weir is not disclosed.

SUMMARY OF THE INVENTION

Thus, an objective of the present invention is to provide a method of the type mentioned above such that, on one hand, the energy consumption is optimized during base load operation, and, on the other hand, the decanting centrifuge is operated such that with sudden changes in type and amount of the supplied product, a control with regard to a specified dry matter concentration of the separated dry phase can be ensured.

This objective is accomplished through a method of the type mentioned above which is characterized by the following steps:

e) Specifying a tank depth tolerance range with a lower tank depth $x_{T,U}$ and an upper tank depth $x_{T,O}$;

f) Comparing the adjusted tank depth $X_W$ with the tank depth tolerance range, and continued carrying out of steps b) to f) while the tank depth $x_T$ is within the tank depth tolerance range;

g) Raising the centrifuge drum speed $n_Z$ by a speed step value $\Delta n_Z$ at a tank depth $x_T$ that is smaller than the lower tank depth $x_{T,U}$, or lowering the centrifuge drum speed nZ by a speed step value $\Delta n_Z$ at a tank depth $x_T$ that is greater than the upper tank depth $x_{T,O}$;

h) Adjusting the tank depth $x_T$ corresponding to the dry matter concentration $c_{TS}$ in the drawn-off dry phase until it reaches the specified nominal dry matter concentration $c_{TS,O}$; and i) Comparing the re-adjusted tank depth $x_T$ with a specified tank depth tolerance range and repeating steps f) to i) when the tank depth $x_T$ violates the tank depth tolerance range with a continued feed of the multi-phase mixture into the rotating centrifuge drum and drawing off of the liquid phase and the dry phase.

The advantages achieved with the method of the invention are in particular that a decanting centrifuge can be operated with an immersion disk and a liquor weir such that at base load operation with an essentially constant amount and concentration of the feed an optimization can be carried out with regard to energy consumption, while at the same time a readiness for a reaction to sudden changes is ensured in that the weir is returned to a middle position, which is defined by the tolerance range, from which it can either concentrate or dilute the dry phase.

In a particular advantageous embodiment of the method, a decanting centrifuge is used, where the liquor weir consists of a weir plate with at least one liquor opening and of a baffle plate that is supported in a fixed manner by forming a weir gap in relation to the weir plate and that can be moved axially. The tank depth $x_T$ can be lowered by increasing the weir gap width $x_W$, or raised by decreasing the weir gap width $x_W$. Assigned to the tank depth tolerance range is a corresponding weir gap tolerance range with a lower weir gap width $x_{W,U}$ and an upper weir gap width $x_{W,O}$. Since an increase in the weir gap width lowers the dynamic pressure at the weir, the tank depth in return will decrease as well. Thus, the upper tank depth $x_{T,U}$ is reached at the lower weir gap width $x_{W,U}$ of the weir gap width tolerance range and vice versa.

An additional embodiment of the method provides that a decanting centrifuge be used, where the liquor weir includes at least one axially stretching, u-shaped liquor channel with an inlet and an outlet opening that are arranged in the direction of the outside circumferences of the liquor weir, and where pressure gas can be introduced in the area of a U-shaped bend of the liquor channel, thus building a hydro-hermetic pressure chamber. With this method, the tank depth xT can be raised by increasing the gas pressure and lowered by decreasing the gas pressure. Assigned to the tank depth tolerance range is a corresponding gas pressure tolerance range with a lower gas pressure $p_U$ and an upper gas pressure $p_O$.

Additional advantageous embodiments of the method can be obtained from the subclaims and the description of an exemplary embodiment below, which makes reference to the drawing.

The invention relates to a decanting centrifuge system for performing said method with at least the following individual parts:

A decanting centrifuge comprised of:

A hollow shaft that includes at least one feed pipe located inside said shaft;

A centrifuge drum capable of rotating around the hollow shaft and provided with at least one dry matter discharge opening that is penetrating its drum jacket;

An annular immersion disk that is at its inside circumference connected to the hollow shaft and that has an outside diameter that is smaller than the inside diameter of the drum jacket;

At least one liquor weir with a weir gap arranged at the centrifuge drum, where the liquid phase can be discharged from the centrifuge drum through said gap, and with a tank depth setting device that can be used to set the tank depth $x_T$ of the liquid phase that rotates in the centrifuge drum;

A sensor device for the measurement of the dry matter concentration $c_{TS}$ in the drawn-off dry phase; and A weir control device for controlling the tank depth $x_T$ corresponding to the dry matter concentration $c_{TS}$.

A decanting centrifuge system with the features of the main subject of claim 17 is known from the publication "Intelligente Mess-und Regelungstechnik zur optimierten Prozessführung bei der Abwasserbehandlung" (DR. H.-J. BEYER/M. FLEUTER, Westfalia Separator Industry GmbH in: 4. Mersebuger Fachtagung Automatisierung, Messmethoden und Experimente in der mechanischen Verfahrenstechnik, November 1999) ["*Intelligent Measurement and Control Technology for Optimized Process Management in Waste Water Treatment*" (DR. H.-J. BEYER/M. FLEUTER, Westfalia Separator Industry GmbH in: 4$^{th}$ *Merseburg Symposium on Automation, Measurement Methods and Experiments in Mechanical Process Engineering*, November 1999)]. Using weir control results in the fact that the tank depth $x_T$ is adjusted corresponding to the dry matter concentration $c_{TS}$. This essentially allows for the automation of the phase separation process. However, operator control is still required if significant changes in type, amount and/or concentration of the supplied product occur, and the weir has reached a limit position from which it can no longer react to the occurring changes. In addition, high energy consumption is observed due to the high drum speeds.

Thus, an objective of the present invention is to provide a decanting centrifuge system such that the energy consumption in separating a multi-phase mixture using a decanting centrifuge is reduced, and in addition, such that changes in amount and concentration of the supplied product can be compensated for without control through the operator.

This objective is accomplished with a decanting centrifuge of the type mentioned above that is characterized by a speed control device for controlling the drum speed $n_Z$ corresponding to the tank depth $x_T$ and to the dry matter concentration $c_{TS}$, using a concentration signal input, a tank depth signal input and a speed control signal output.

With such a decanting centrifuge system, it is possible to automatically influence two control variables, namely the tank depth and the speed. In this case, the speed control is the subordinate control. The weir control device for controlling the tank depth corresponding to the dry matter concentrations has priority. Thus, speed control is assigned a role as a complementing system that can achieve optimization of the energy consumption during base load operation or that can optimize the position of the weir with regard to reactions of the system to changes in the feed.

In case of a failure of the weir control device, the dry matter concentration can be controlled, or at least reduced to such a degree that the dry matter remains capable of flowing such that clogging of the discharge line can be prevented, through changes in the drum speed.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
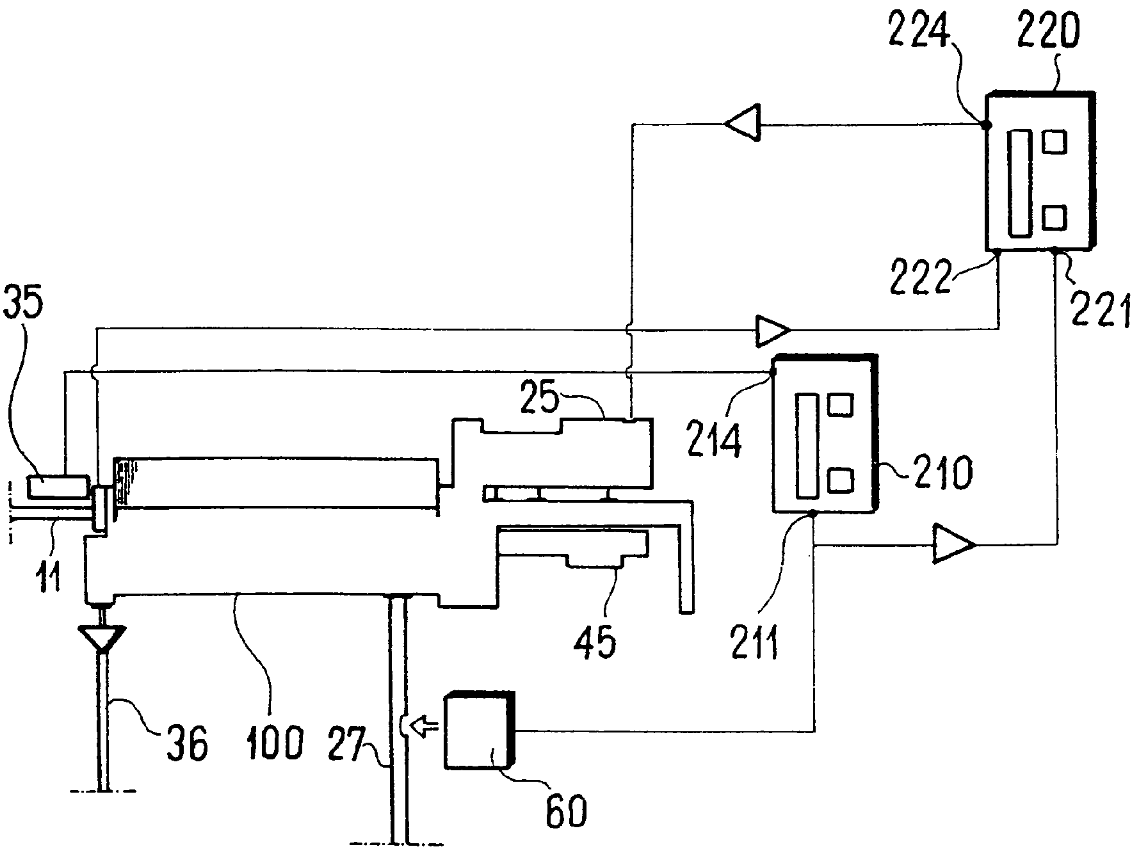
FIG. 1 shows a schematic overview of a first embodiment of a decanting centrifuge system.

The preferred embodiment of the present invention will now be described with reference to FIGS. 1–7 of the drawings. Identical elements in the various figures are designated with the same reference numerals.

FIG. 1 shows a first embodiment of a decanting centrifuge system subject to the invention. A decanting centrifuge 100 is connected to a feed pipe 11, a liquor line 36 and a dry matter discharge line 27. The decanting centrifuge includes a drum drive device 25 for driving a centrifuge drum 20 (FIG. 3) and a screw drive device 45 for driving a conveyor screw 40. In addition, the decanting centrifuge 100 is provided with a liquor weir that can be adjusted using a weir-adjusting device 35.

Located at the dry matter discharge line 27 is a sensor device 60 that can be used to measure a dry matter concentration $c_{TS}$ in the dry phase that is drawn off at that location. The measuring signal of the sensor device 60 is supplied to the concentration signal input 211 of a weir control device 210. In the first embodiment shown here, a weir gap control signal is output at its control output 214 and supplied to the weir adjustment device 35. The design of the weir control device as a PI control has proven particularly suitable. Due to a high integrating portion, control deviations can initially be averaged over a period of time such that oscillation of the decanting centrifuge system is avoided.

The measuring signal of the sensor device 60 is also supplied to the concentration signal input 221 of a speed control device 220. A signal that transmits the current weir gap width is supplied to a weir gap width signal input 222. This weir gap width signal can also be tapped directly at the control output 214 of the weir control device 210 such that it represents a nominal value of the weir gap width.

However, it is preferred to determine the actual weir gap width by measuring the path distance directly at the weir, and to supply the measurement to the weir gap signal input 222 of the speed control device 220. The speed control device 220 is designed as a step controller.

Figure 2:
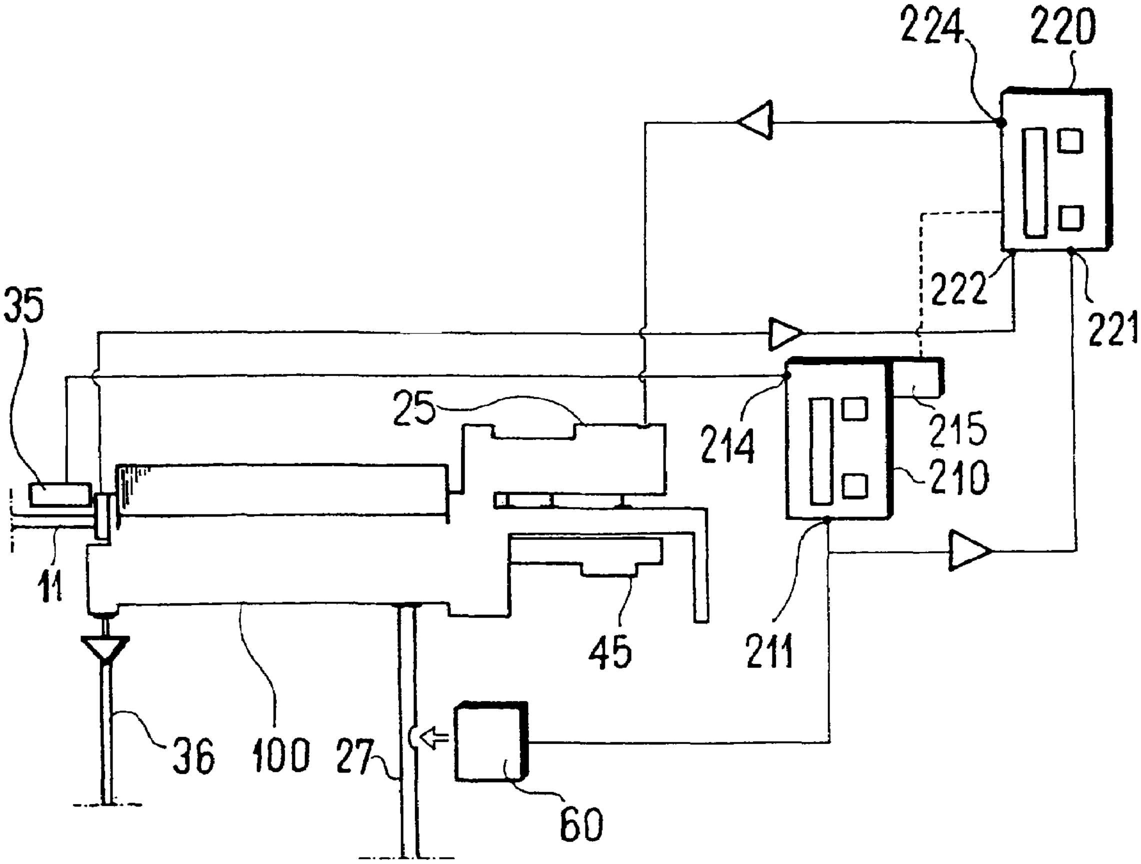
FIG. 2 shows a schematic overview of a second embodiment of a decanting centrifuge system.

The preferred embodiment presented in FIG. 2 is different from the embodiment of FIG. 1 in that it includes a deactivating device 215 that unlocks the speed control device 220 only when the start-up phase of the process is finished and the weir gap width $x_W$ has been adjusted preliminarily by the weir control device 210. In addition, the deactivation device 215 deactivates the speed control device 220 after a change in the drum speed until the impact on the dry matter concentration $c_{TS}$ that is to be measured at the sensor device and that is the result of said change has been compensated for by the weir control device 210. Thereafter, the speed control device 220 is again unlocked such that it can carry out a change in the drum speed when required.

Figure 3:
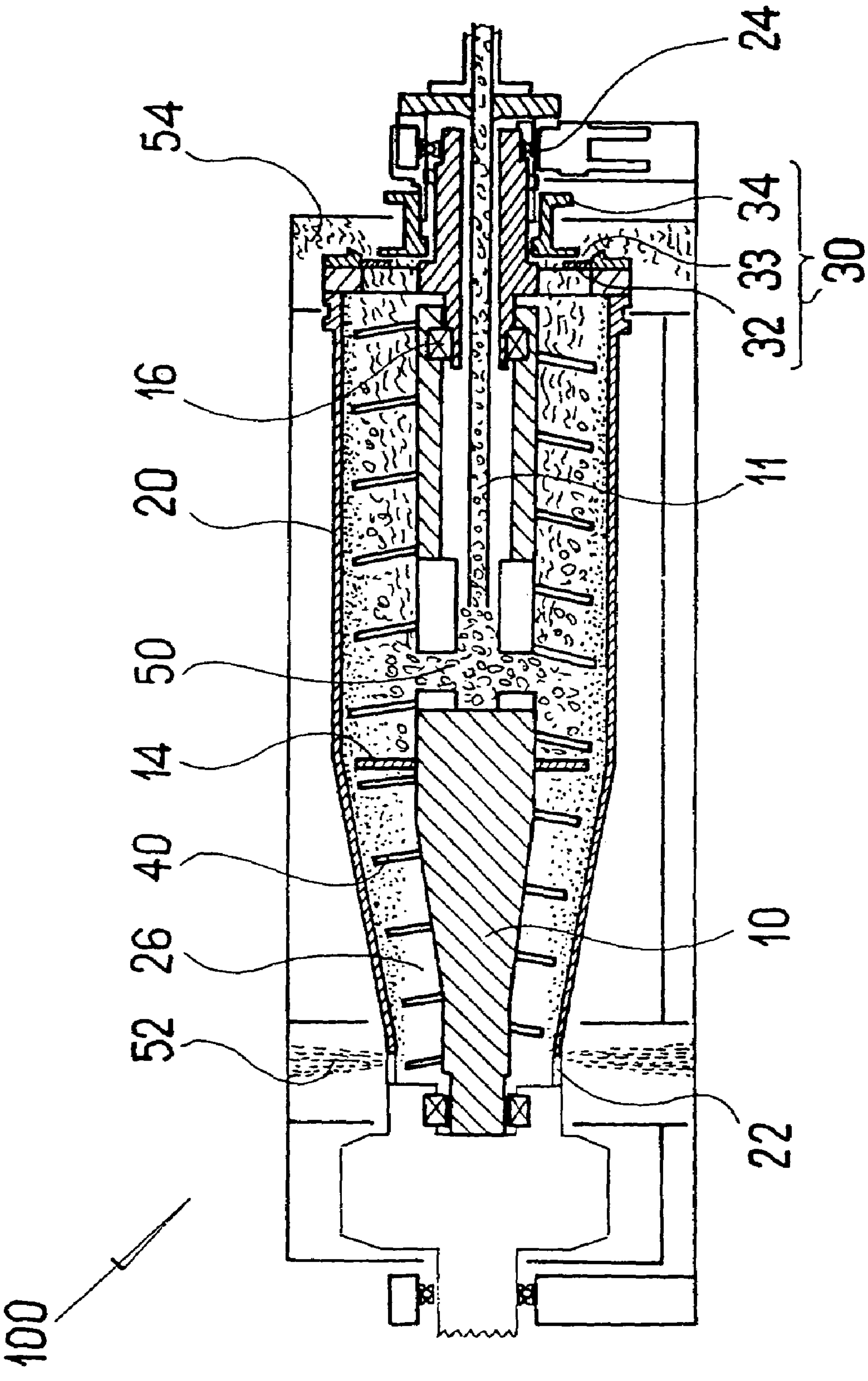
FIG. 3 shows a sectional view of the inner structure of a decanting centrifuge with a mechanical liquor weir.

FIG. 3 shows the inner structure of a decanting centrifuge 1 that consists essentially of a centrifuge drum 20, a hollow shaft 10, a liquor weir 30 and a conveyor screw 40.

The centrifuge drum 20 is rotatably supported at support points 23, 24 and can be turned using a drum drive device 25 (cf. FIG. 1). A hollow shaft 10, which is supported via bearings 15, 16 in a rotatable manner at the drum jacket 21, is located inside the centrifuge drum 20. A fixed feed pipe 11 that ends at at least one inlet opening 12 protrudes into an axial borehole of the hollow shaft. This provides a connection from the inner borehole to the outside circumference of the hollow shaft 10. Attached to the outside circumference of the hollow shaft 10 is a conveyor screw 40 that can be turned using a screw drive device 45. The screw drive device may also be designed as a part of the drum drive device 25, for example, by using a separate gear step. The hollow shaft 10 and the drum jacket have a concentric arrangement such that an annular space is created between the hollow shaft 10 and the drum jacket 21. The hollow shaft includes an immersion disk 14 that, according to the embodiment shown in FIG. 1, is located near a taper of the cross-section of the hollow shaft 10 and the drum jacket 21. The immersion disk 14 is attached to the hollow shaft and closes the annular space 26 toward the hollow shaft. The outside circumference of the immersion disk is kept at a distance to the inside circumference of the centrifuge jacket 21, such that it is possible for the liquid or dry matter to pass through. At the end of the tapered area, the drum jacket 21 is provided with at least one opening 22 for discharging the dry matter.

Located at the opposite axial end of the centrifuge drum 20 is a liquor weir 30. The centrifuge drum is closed with a weir plate 32 that includes several openings that allow for liquid to be discharged. Located opposite to the weir plate is a baffle 34 that is attached to a fixed part of the housing of the decanting centrifuge 1 and that does not rotate with the cylinder drum 20. The baffle plate 34 can be moved parallel to the rotational axis of the cylinder drum 20. The width of a weir gap 33 that is generated between weir plate 32 and baffle plate 34 can thus be varied even at a rotating cylinder drum 20.

Adjusting the baffle can be carried out via electrical or pneumatic adjustment devices that can be controlled via a gap width signal, which is put out by the control output 214 of the weir control device 210.

Figure 6:
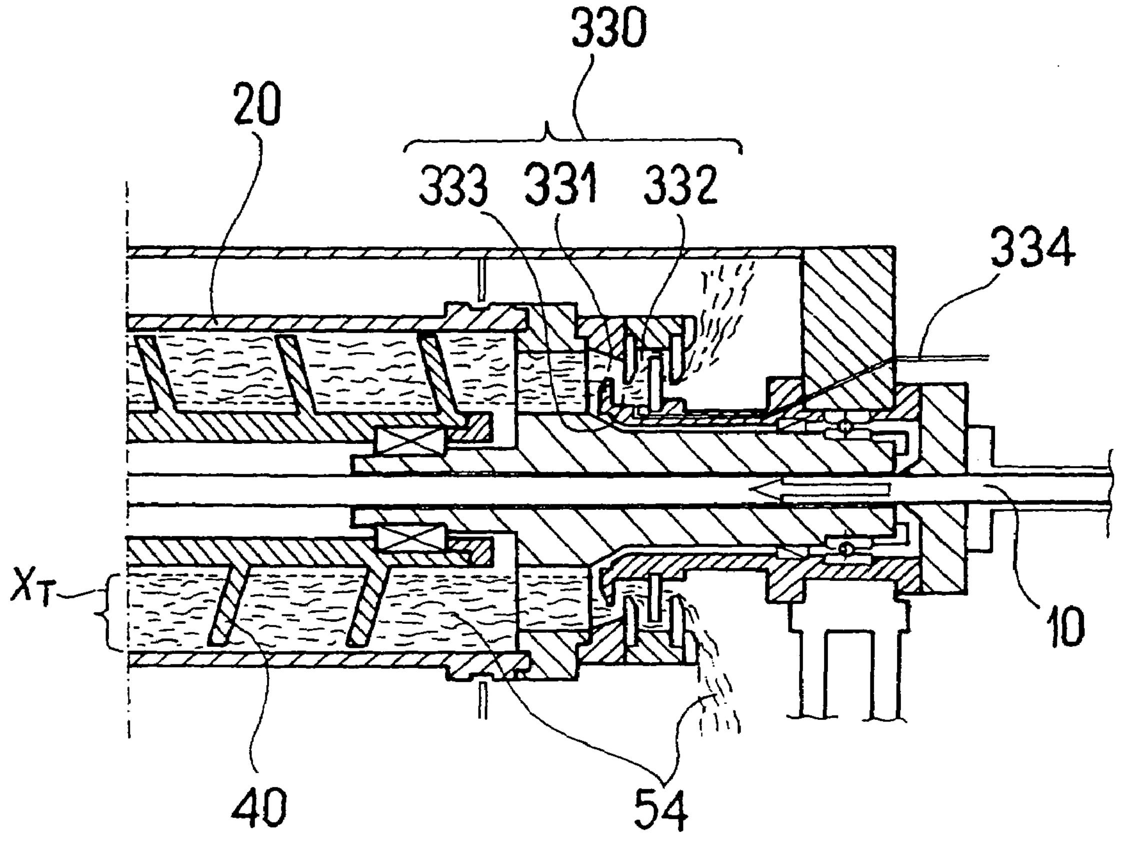
FIG. 6 shows a sectional view of a decanting centrifuge with a pneumatic liquor weir.

FIG. 6 shows a section of a decanting centrifuge with a pneumatic liquor weir 330. It exhibits a U-shaped liquor channel with an inlet opening 331 directed toward the centrifuge drum 20, a U-shaped bend and a discharge opening 332. In the embodiment shown in FIG. 6, an additional U-shaped channel redirection follows such that a labyrinth seal with a total of 4 redirections is formed. Using a pressure gas line 334, the pressure gas can be supplied to the liquor channel in the area of the U-shaped bend 333, where a hydro-hermetic chamber is formed. The pressure gas introduced in the bend 333 increases the flow resistance for the liquid phase 54 and increases thus the dynamic pressure at the liquor weir 330 such that the tank depth $x_T$ increases and the dry matter concentration of the discharged sludge phase 52 decreases. If too high a gas pressure is selected, the gas phase will break out of the bend 333 of the channel and collect either in the centrifuge drum 20 or it will flow to the outside. With a gas phase that approximately corresponds to the pressure of the rotating liquid phase in the bend 333, no gas will enter into the liquid phase 54, such that said liquid phase can discharge without obstacles. If these pressure values are violated in either direction, the tank depth is no longer influenced. If the gas pressure lies between the mentioned pressure limits, the method of the invention can be applied in the same manner as has been stated above for a decanting centrifuge with a mechanically adjustable liquor weir 30. The decanting centrifuge system described above can also be operated using its sensor 60 and control devices 210, 220, also together with the decanting centrifuge with a pneumatically adjustable liquor weir 330.

Below, the method according to the invention will be explained referring to the drawing.

The product to be processed is a multi-phase mixture that includes at least one liquid phase and one solid matter phase that does not dissolve in said liquid phase. In the embodiment of the method introduced here, the objective of the separation process is to separate the solid matter phase with minimum residual liquid; at the same time, however, the dry phase consisting of solid matter and residual liquid shall still be transportable through the pipe system such that it must remain capable of flowing. This objective is given, for example, when processing effluent sludge in communal wastewater treatment plants.

The cylinder drum is accelerated to a high nominal speed $n_{Z0}$ and the product is introduced. The nominal speed $n_{Z0}$ is limited by the design of the decanting centrifuge 100. At a high nominal speed $n_{Z0}$ at the beginning of the process, the dry phase 52 being separated in the centrifuge drum exhibits a high dry matter concentration $c_{TS}$.

With a large difference in density between the solid and the liquid phase, solid matter is easier to sediment. In such cases, the nominal speed $n_{Z0}$ can be lower than the maximum speed $n_{Z,max}$, which is determined by the design. The method can then start at a start-up speed that corresponds to 0.3 to 0.7 times the maximum speed. In this manner, the dry phase initially exhibits a higher amount of residual water. To compensate for this, the method starts initially with a wide open weir, such that as much liquid as possible can run off.

In any case, at the beginning of the process, the nominal speed $n_{Z0}$ is selected high enough to achieve a strong phase separation and to avoid that fine dust is flushed out with the separated liquid phase.

To ensure the ability of the dry phase 52 to flow and to already discharge at the start-up phase such a high volume that the pipe system at the discharge side is filled and that it be possible to measure the dry matter concentration $c_{TS}$ using the sensor device 60, the dry matter separated at a high nominal speed is charged with liquid. To this end, at the start-up of the process, the weir gap width $x_W$ of the weir gap 33 is initially set to a start-up value that is about 0.5% to 5% of the maximum settable weir gap width $x_{W,max}$. Due to the narrow weir gap 33, the pressure in the annular ring space 26 increases such that liquid 54 presses into the thrown off dry phase 52. The thusly re-thinned dry phase 52 is conveyed past the immersion disk 14 to the dry matter discharge opening 22.

Figure 5A:
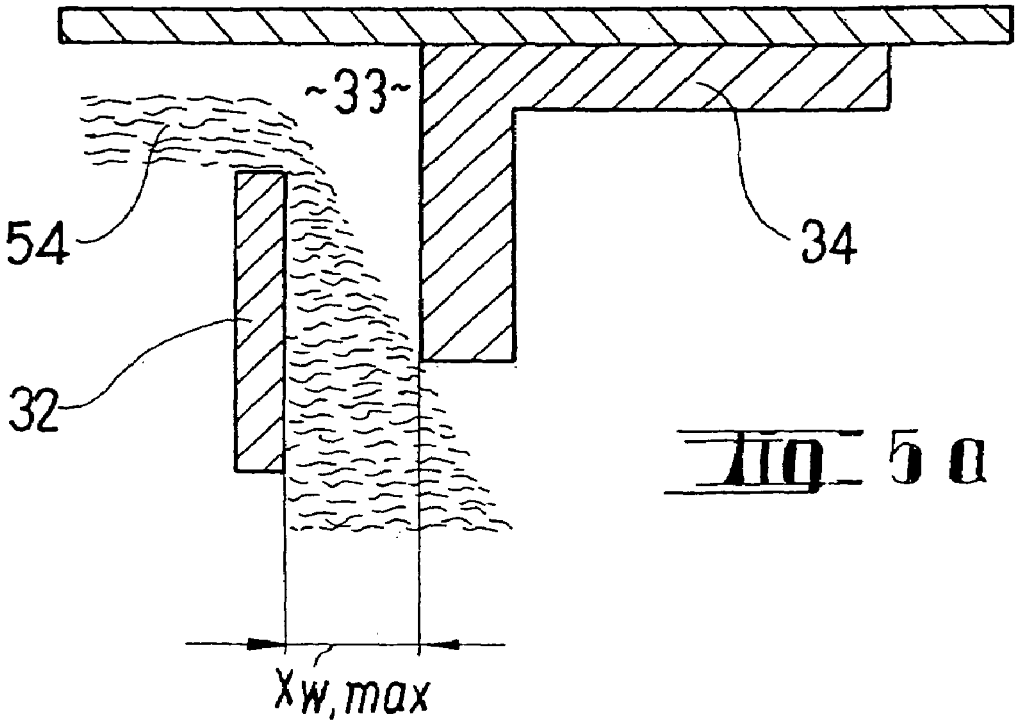
FIGS. 5*a,b* show the influent liquid in a sectional view of various postions of a mechanical liquor weir.
Figure 5B:
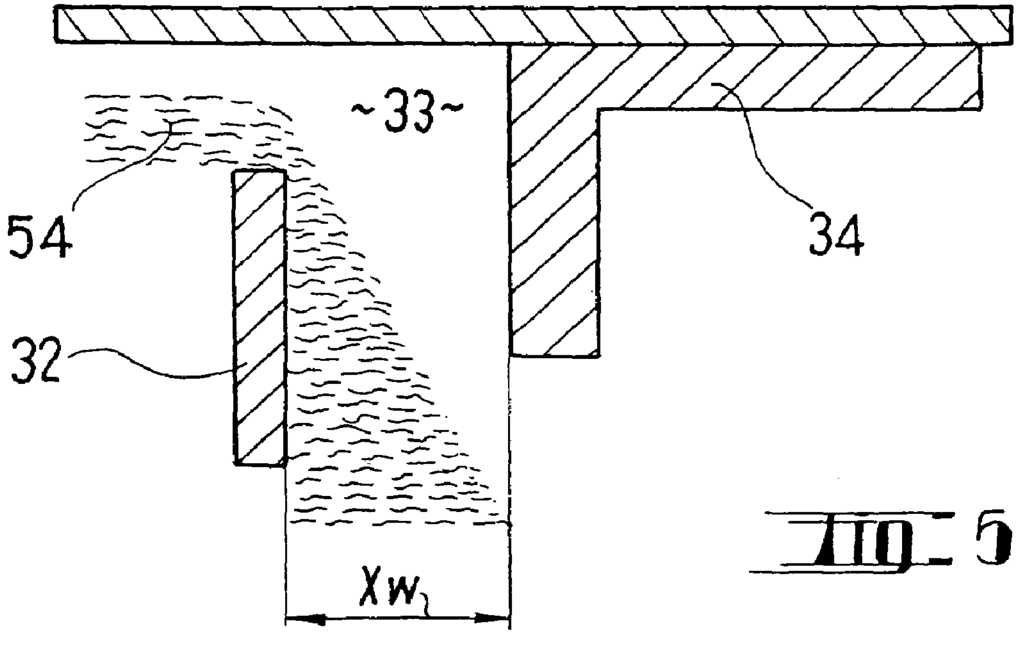

The width ratios at the weir are shown schematically in FIGS. 5*a* and 5*b*. After the discharge from the weir plate 32, the liquid phase 54 is thrown radially towards the outside due to the high centrifugal forces. With a very wide opening of the weir gap 33 as shown in FIG. 5*b*, the liquid phase is thrown off and no longer wets the baffle plate 34. The gap width $x_W$ is then without influence on the hydraulic conveyance of the dry phase 52 in the centrifuge drum 20. Thus, the maximum settable weir gap width $x_{W,max}$ is that width of the weir gap 33, where wetting of the baffle 34 by the discharged liquid phase still occurs, and therefore a control of the dynamic pressure of the liquid phase can occur.

Thereafter, the weir gap width $x_W$ is controlled corresponding to the dry matter concentration $c_{TS}$ in the drawn-off dry phase 52 until a specified nominal dry matter concentration $c_{TS,0}$.

Defined as a desired point of operation is a weir gap width that is specified taking into account machine-technological and product-specific data, which may be determined using pre-trials. Further specified are a weir gap width tolerance range around the operating point as designated with the number 37 in FIG. 4*b*, and a start-up weir gap width $x_{W,1}$. The width of the weir gap width tolerance range 37 is preferably 0.5% to 5% of the maximum weir gap width $x_{W,max}$.

The operating point may also be specified to be in the center of the process-technologically effective travel range of the baffle plate 34, such that the resulting travel path reserves are of equal size in both directions.

After the start-up of the process as described above, the optimization of the process with the objective of energy conservation subject to the invention begins as long as the adjusted weir gap width $x_W$ is not within the weir gap width tolerance range 37.

If the weir gap width is within the weir gap width tolerance range 37, the process continues without energy consumption optimization through continued feed of product and drawing off of the liquid phase and the dry phase. Control of the weir gap width is used to react to changes in concentration and amount, such that the dry matter concentration $c_{TS}$ corresponds again to a specified nominal value within a short period.

If the weir gap width cannot be increased any further because it is close to the maximum weir gap width $x_{W,max}$, the speed of the drum $n_Z$ is increased such that the dry matter concentration $c_{TS}$ in the dry phase has a tendency to be increased. This is counteracted by a pressure increase in the liquid phase, which is caused by a reduction of the weir gap width $x_W$. Through the steps of speed control and re-adjustment of the weir gap width, the baffle plate of the weir is, potentially after a repeat, again positioned in the weir gap width tolerance range 37.

However, if the adjusted weir gap width $x_W$ is below the specified weir gap width tolerance range 37, then the centrifuge drum speed $n_Z$ is lowered by one speed step value $\Delta n_Z$, which is preferably around 2% of the maximum nominal speed. Carrying out the method with speed step values $\Delta n_Z$ of 30 to 70 rpm is also possible. It has proven that these preferred values for the speed step values are on the one hand large enough to cause energy savings in as short a time as possible. On the other hand, the size of the change forced onto the process does not yet lead to oscillation of the system or to other negative effects.

After the speed change, the weir gap width $x_W$ is re-adjusted according to the dry matter concentration $c_{TS}$ in the drawn-off dry phase 52 until it reaches a specified nominal dry matter concentration $c_{TS,0}$.

The adjusted weir gap width $x_W$, in turn, is compared to the specified weir gap tolerance range 37. As long as the weir gap width $x_W$ is outside the weir gap width tolerance range 37, the steps of reducing the speed,
re-adjusting the weir gap 33, and
checking the weir gap width will be repeated.

Otherwise, energy optimization will be terminated. The weir 30 will then be positioned such that it still has sufficient reserves to move the baffle plate in the process-technologically effective range and thus, to change the weir gap width $x_W$, if a change in the amount and/or composition of the supplied product requires such.

In conclusion, the method according to the invention will be explained again using an example with reference being made to FIG. 7 and FIGS. 4*a* to 4*c*.

The decanting system subject to the invention is used in a communal waste water treatment plant for drying, concentrating or reducing of the volume of effluent sludge, which is a mixture of liquids and solids with a dry matter content of 0.1 to 50 g/l. The goal is dewatering to a dry matter concentration $c_{TS}$ of 60 g/l.

Figure 4A:
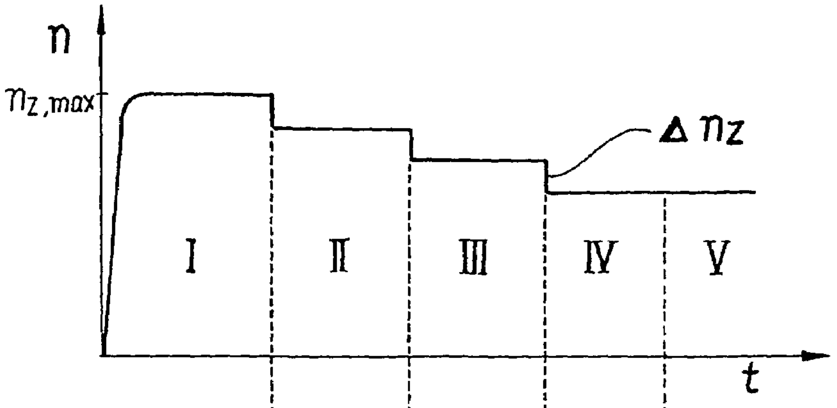
FIGS. 4*a* to 4*c* show the profile of various parameters during the process, each plotted in a diagram above the time axis.
Figure 4B:
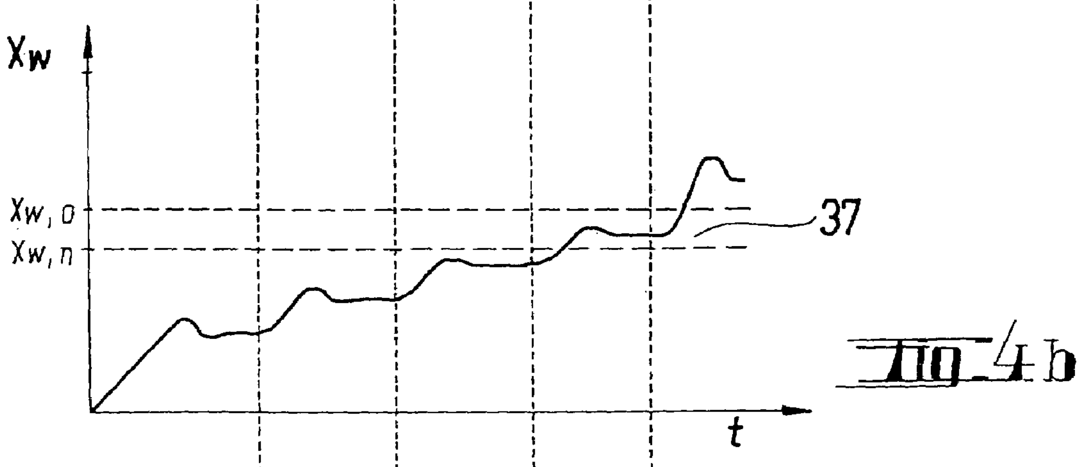
Figure 4C:
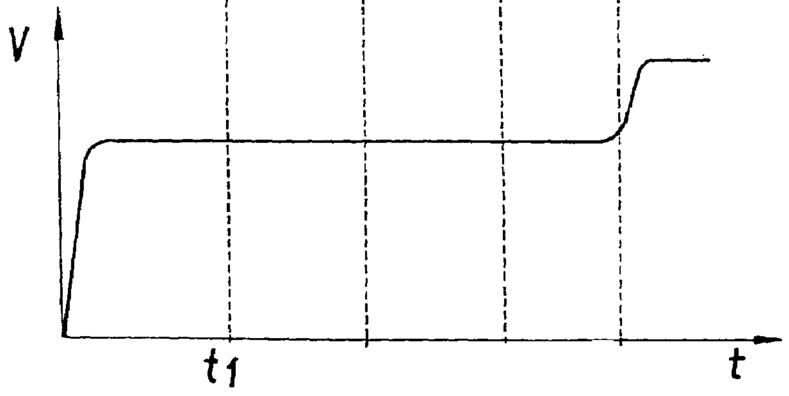

FIG. 4 shows a time line of the drum speed $n_X$ (FIG. 4*a*), the weir gap width $x_W$ (FIG. 4*b*) and the volume flow of the supplied product (FIG. 4*c*) for the method subject to the invention.

In the phase designated with "I", the centrifuge drum 20 is accelerated to a high drum speed that is within the range of the maximum operational and admissible speed corresponding to its design.

As shown in FIG. 4*b*, the weir gap width xW is increased in a ramp function beginning from an almost closed weir gap 33 until the drum is fully filled with the volume of the multi-phase mixture that is intended for the operation, the specified drum speed is reached and a constant volume throughput is present in the decanting centrifuge.

At the end of phase "I", which includes steps a) to d) of the method subject to the invention, a re-adjustment of the weir gap width $x_W$ occurs until a specified dry matter concentration $c_{TS}$ is reached in the drawn-off dry phase 52.

After the re-adjustment, at the beginning of phase "II", the weir gap width $x_W$ is checked to see if it is already within the weir gap width tolerance range 37, which is shown in FIG. 4*b* between the dashed lines.

Since the weir gap width $x_W$ is still outside the tolerance band, a reduction of the drum speed $n_Z$ by a speed step value $\Delta n_Z$ can be carried out, which results in energy savings. The lower dry matter concentration $c_{TS}$ in the discharged dry phase, which is due to the reduction of the drum speed, is compensated for through an increase in the weir gap width $x_W$.

The steps mentioned above are repeated in phases "III" and "IV". At the end of phase "IV", the weir gap width $x_W$ will be within the weir gap width tolerance range 37 after performing the re-adjustment.

Thus, the speed control device 220 is deactivated, and the drum speed will not be reduced further. The weir 30 will now be in a position from which the decanting centrifuge system of the invention can react in both directions to changes in the product feed. The weir gap 33 can be opened further to increase the removal of liquid for products with a low dry matter concentration. However, it can also be closed further in order to retain a certain residual wetness in the discharged dry phase for a more concentrated product, which will prevent clogging of the discharge line systems.

Phase "V" of FIG. 4*c* shows an increase of the supplied amount, for example due to rain showers. At the same time, however, the solid matter content is low. To keep constant the dry matter concentration $c_{TS}$ of the discharge, the weir gap width $x_W$ is significantly increased from the tolerance range 37 in order to be able to draw off more liquid.

Figure 7:
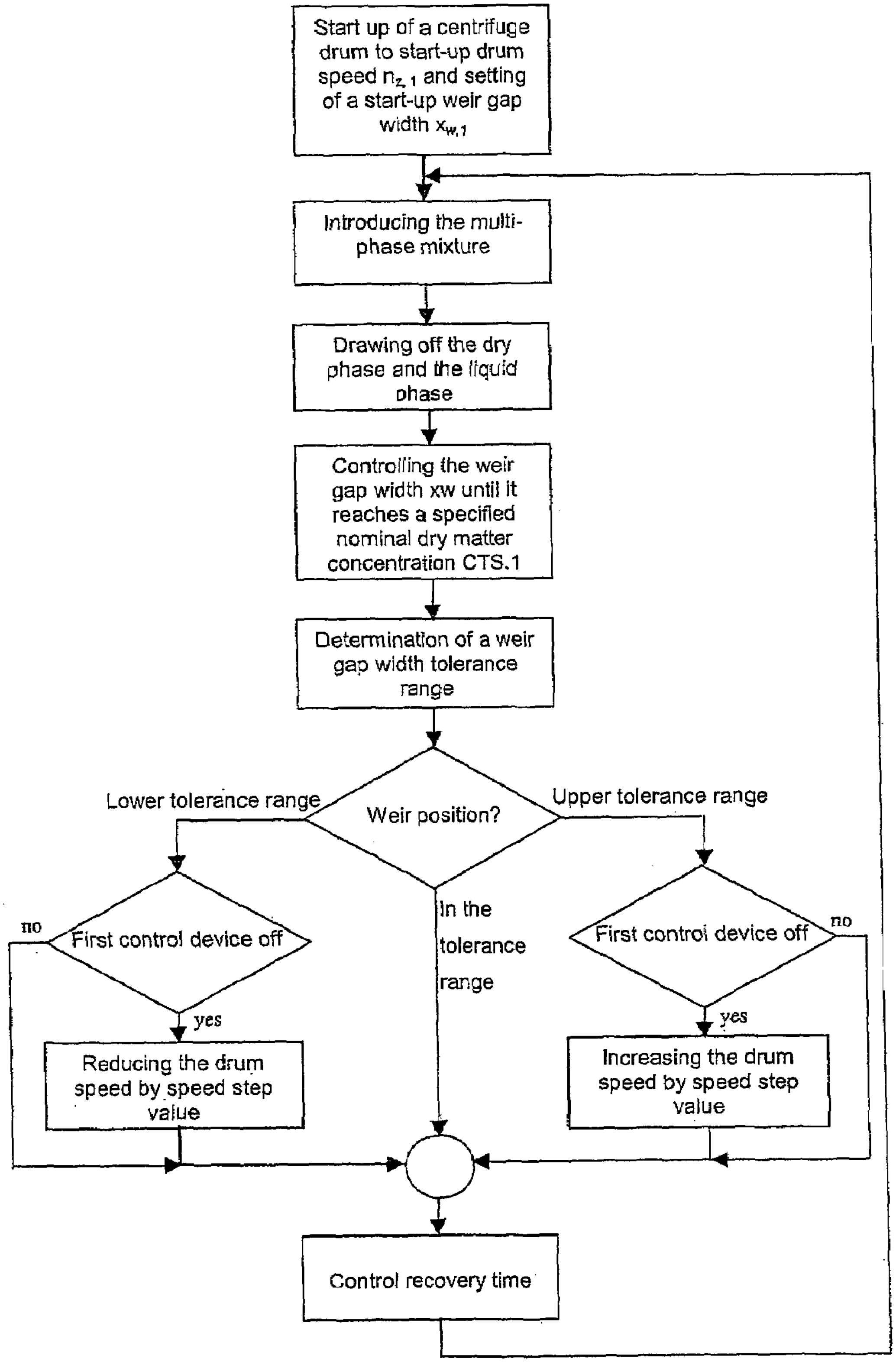
FIG. 7 shows the sequence of the method in a flow diagram.

The sequence of the method is also shown in the flow diagram of FIG. 7. Initially, the centrifuge drum must start to run and the weir must be set to a start-up weir gap width. Then, the feed line of the multi-phase mixture into the rotating decanting centrifuge is opened and is, thus, gradually filled. The liquid phase and the dry phase are continually drawn off.

Using the weir control device 210 (cf. FIG. 1, 2), the discharge concentration is controlled to the desired nominal value via the weir position. During this time, the function of the speed control device 220 is still bypassed. After this bypass time is over, the control is unlocked. The optimum operation point of the weir control device 210 is determined for the specific application taking into account machine-technological and plant-specific data. This operating point is the basis for the range in which the decanting centrifuge operates optimally from the viewpoint of process-technology and energy consumption. Center position and width of this range, in turn, are the basis for the definition of a weir gap width tolerance range.

The current position of the weir is then determined and compared to the weir gap width tolerance range.

If the control point of the weir control device is below this range, the decanter is running below capacity, and the drum speed that is directly related to the energy consumption can be reduced by one speed step value.

If the control value leaves the range in a positive direction, the drum speed is too low and must be raised in order to return the weir position to the weir gap width tolerance range.

If one of the conditions for adjusting the drum speed is given, a check is made whether the weir control device is compensating, that is, whether the discharge concentration corresponds to the nominal value. If this is the case, then the drum speed will be adapted. If the control difference is too big, initially the dry matter concentration $c_{TS}$ must be adjusted and the drum speed must be adjusted in a subsequent step.

Changing the drum speed may result in a new operating point for the continuously active weir control device. This operating point must be determined by the control and must be approached. For this purpose, a recovery time for the control starts. The cycle that will lead to the determination of the weir gap width tolerance range and to a renewed comparison of the of the weir position with the tolerance range will start again at the end of said recovery time.

There has thus been shown and decribed a novel method for separating a multi-phase mixture and a decanting centrifuge system for carring out said method which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for separating a multi-phase mixture, into at least one liquid phase and one dry phase with a given dry matter concentration $c_{TS}$ using a decanting centrifuge which includes:

(a) an annular immersion disk that is connected to a shaft at its inside circumference and that exhibits an outside diameter that is smaller than the inside diameter of a centrifuge drum; and (b) at least one liquor weir with a weir gap arranged at the end face of the centrifuge drum that can be used to draw the liquid phase from the centrifuge drum, and with a tank depth setting device that can be used to set the tank depth $X_T$ of the liquid phase that rotates in the centrifuge drum;

said method comprising the steps of:

(1) starting up of the centrifuge drum to a start-up drum speed $n_{Z,1}$, and setting the tank depth $x_T$ to a start-up tank depth $X_{T,1}$;

(2) introducing the multi-phase mixture into the rotating centrifuge drum;

(3) drawing off the dry phase through the at least one dry matter discharge opening and drawing off the liquid phase through the weir gap;

(4) controlling the tank depth $x_T$ corresponding to the dry matter concentration $c_{TS}$ in the drawn-off dry phase until a specified nominal dry matter concentration $c_{TS,1}$ is reached, using the tank depth setting device;

(5) specifying a tank depth tolerance range with a lower tank depth $X_{T,U}$ and an upper tank depth $X_{T,O}$;

(6) comparing the adjusted tank depth $x_W$ with the tank depth tolerance range and continuing carrying out of steps (2) to (6) while the tank depth $x_T$ is within the tank depth tolerance range;

(7) raising the centrifuge drum speed nz by a speed step value $\Delta n_Z$ at a tank depth $x_T$ that is smaller than the lower tank depth $x_{T,U,}$ or lowering the centrifuge drum speed $n_Z$ by a speed step value $\Delta n_Z$ at a tank depth $x_T$ that is greater than the upper tank depth $x_{T,O}$;

(8) re-adjusting the tank depth $x_T$ corresponding to the dry matter concentration $c_{TS}$ in the drawn-off dry phase until it reaches a specified nominal dry matter concentration $c_{TS,0}$; and (9) comparing the re-adjusted tank depth $x_T$ with a specified tank depth tolerance range and repeating steps (6) to (9) if the tank depth $x_T$ violates the tank depth tolerance range under continued feed of the multi-phase mixture into the rotating centrifuge drum and drawing off of the liquid phase and the dry phase.

2. A method as set forth in claim 1, wherein a decanting centrifuge is used with a liquor weir that consists of a weir plate with at least one opening for liquids and of a baffle plate with a fixed support against the weir plate by forming a weir gap and axially movable in relation to the weir plate, and wherein the tank depth $x_T$ can be lowered by increasing the weir gap width $x_W$ and can be raised by decreasing the weir gap width $x_W$, whereby a respective weir gap width tolerance range with a lower weir gap width $x_{W,U}$ and an upper weir gap width $x_{W,O}$ is assigned to the tank depth tolerance range.

3. A method as set forth in claim 2, wherein half of the maximum weir gap width $x_{W,max}$ is selected as the center point of the weir gap width tolerance range, whereby the baffle plate is not yet wetted by the liquid phase that is discharged through the weir gap.

4. A method as set forth in claim 2, wherein the weir gap width $x_W$ adjusted in step (4) is selected as the center point of the weir gap width tolerance range.

5. A method as set forth in claim 2, wherein for setting the start-up tank depth $x_{T,1}$, a start-up weir gap width $x_{W,1}$ corresponding to 0.5% to 5% of the maximum weir gap width $x_{W,max}$ is selected in step (1).

6. A method as set forth in claim 2, wherein the width of the weir gap width tolerance range between a lower weir gap width $x_{W,U}$ and an upper weir gap width $x_{W,O}$ is 0.5% to 5% of the maximum weir gap width $x_{W,max,}$.

7. A method as set forth in claim 2, wherein in step (4), the weir gap width $x_W$ is raised as a linear function of the time, as long as a control deviation of the measured dry matter concentration $c_{TS}$ from the nominal dry matter concentration $c_{TS,1}$ is more than 10%.

8. A method as set forth in claim 1, wherein a decanting centrifuge is used with a liquor weir that includes at least one axially stretching U-shaped liquor channel with inlet and outlet openings that are arranged towards the outer outside circumference of the liquor weir, and where a pressure gas can be introduced in the area of the U-shaped bend, thus forming a hydro-hermetic pressure chamber, and wherein the tank depth $x_T$ can be raised by increasing the gas pressure and can be lowered by reducing the gas pressure, whereby a respective gas pressure tolerance range with a lower gas pressure $p_U$ and an upper gas pressure $p_O$ is assigned to the tank depth tolerance range.

9. A method as set forth in claim 8, wherein for setting the start-up tank depth $x_{T,1}$, a start-up gas pressure $p_1$ corresponding to 95% to 99.5% of the maximum gas pressure $p_{max}$ is selected in step (1).

10. A method as set forth in claim 8, wherein the width of the gas pressure tolerance range between a lower gas pressure $P_u$ and an upper gas pressure $p_O$ is 0.5% to 5% of the maximum gas pressure $p_{max}$.

11. A method as set forth in claim 8, wherein in step (4) the gas pressure is lowered as a linear function of the time, as long as a control deviation of the measured dry matter concentration $c_{TS}$ from the nominal dry matter concentration $c_{TS,1}$ is more than 10%.

12. A method as set forth in claim 1, wherein the tank depth $x_T$ that has been adjusted in step (4) is selected as the center point of the tank depth tolerance range.

13. A method as set forth in claim 1, wherein the maximum admissible and design-dependent speed $n_{Z,max}$ of the decanting centrifuge is selected as the start-up drum speed $n_{Z,1}$.

14. A method as set forth in claim 1, wherein the start-up drum speed $n_{Z,1}$ is selected as 0.5 to 0.7 times the maximum admissible and design-dependent speed $n_{Z,max}$ of the decanting centrifuge.

15. A method as set forth in claim 1, wherein the speed step value $\Delta n_Z$ corresponds to 1% to 3% of the maximum admissible and design-dependent speed $n_{Z,max}$.

16. A method as set forth in claim 1, wherein the speed step value $\Delta n_Z$ is 30 to 70 revolutions per minute.

* * * * *